United States Patent [19]
McConnell et al.

[11] 3,954,697
[45] May 4, 1976

[54] POLY(HIGHER-1-OLEFIN-CO-PROPYLENE) COPOLYMERS AS HOT-MELT, PRESSURE-SENSITIVE ADHESIVES

[75] Inventors: Richard L. McConnell, Kingsport; Doyle A. Weemes, Greeneville; Frederick B. Joyner, Kingsport, all of Tenn.

[73] Assignee: Eastman Kodak Company, Rochester, N.Y.

[22] Filed: Mar. 31, 1975

[21] Appl. No.: 563,534

[52] U.S. Cl. ............................. 526/350; 260/80.78
[51] Int. Cl.$^2$ ...................................... C08F 210/14
[58] Field of Search ............... 260/88.2 F, 80.78

[56] References Cited
UNITED STATES PATENTS

| | | | |
|---|---|---|---|
| 3,635,754 | 1/1972 | Beede | 260/88.2 F |
| 3,635,755 | 1/1972 | Balinth et al. | 260/88.2 F |

FOREIGN PATENTS OR APPLICATIONS

| | | |
|---|---|---|
| 856,337 | 11/1970 | Canada |
| 1,396,054 | 3/1965 | France |

*Primary Examiner*—Alan Holler
*Attorney, Agent, or Firm*—Clyde L. Tootle; Daniel B. Reece, III

[57] ABSTRACT

This invention relates to single component, hot-melt, pressure-sensitive adhesives based on propylene/higher 1-olefin copolymers containing 40–60 mole % of the higher 1-olefin. Suitable comonomers include 1-hexene through 1-decene. These new adhesives can be readily applied to substrates such as tape by means of conventional hot-melt coating equipment and thereby eliminate the solvent pollution problems associated with the application of current solvent-based pressure-sensitive adhesives. Our hot-melt coated tapes generally have pressure-sensitive adhesive properties at least equivalent to those of solvent coated pressure-sensitive tapes.

12 Claims, No Drawings

POLY(HIGHER-1-OLEFIN-CO-PROPYLENE) COPOLYMERS AS HOT-MELT, PRESSURE-SENSITIVE ADHESIVES

This invention relates to propylene containing copolymers which contain 40 to 60 mole percent of linear 1-olefins having from 6–10 carbon atoms. These copolymers are permanently tacky and are useful as single component hot-melt, pressure-sensitive adhesives.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressure-sensitive compositions were based on blends of high molecular weight synthetic and natural rubbers with tackifiers. Frequently fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like. Although PSA compositions have generally been applied to the backings from solvents, there is a strong desire to switch to PSA materials which can be applied as hot melts to eliminate solvent pollution during manufacturing of the products. Also, a non-solvent adhesive is desirable since many solvents are in short supply.

Heretofore it has been recognized that certain prior art copolymers containing 1-hexene or 1-octene were permanently tacky. However, it was not until recently that the critical property requirements for a pressure-sensitive adhesive material were known. Therefore, not all copolymers which are permanently tacky are useful as pressure-sensitive adhesives. For example, poly-1-hexene or 1-hexene copolymers containing minor amounts of propylene (e.g., 5–20 wt. % propylene) are permanently tacky but they have very poor cohesive strength. Therefore, such materials leave a residue when coated polyester tapes are stripped away from steel plates and they fail in the static shear test after less than 100 min. (>1000 min. required to pass static shear test).

The copolymers described in Canadian Pat. No. 856,337 are made with highly stereospecific catalysts and even those containing equal molar amounts of propylene and 1-hexene contained substantial blocks of each monomer. This "blockiness" prevents these copolymers from retaining a high degree of tack. Therefore, the adhesives basically are hot melt adhesives which require reactivated at elevated temperatures (e.g., 180°F.) for bonding various substrates but are not pressure-sensitive adhesives as defined in the present invention.

Also, crystalline copolymers based on 1-butene, or propylene, with other straight chain olefins having at least three carbon atoms, as described in French Pat. No. 1,396,054, have melting points of 80°–125°C., densities of 0.86–0.93, molecular weights of 3,000–8,000, and penetration hardness values of <4 (250 g. weight). While French Pat. No. 1,396,054 teaches that these crystalline copolymers can be used as thermoplastic or hot melt adhesives, these crystalline copolymers are not suitable as pressure-sensitive adhesives.

It is also known in the art that certain olefin-copolymers having intrinsic viscosities of 1.5–7.0 and a molecular structure such that 40–75% by weight of the polymer is isotactic material are useful as pressure-sensitive adhesives. The polymers are made at 30°C. using a $R_3Al/TiCl_4$ catalyst. Monomers used include olefins having 2 to 16 carbon atoms. These high molecular weight polymers are applied to the backing material (silicone-coated kraft paper) from heptane solutions containing 16 wt. % polymer. Only qualitative tests (such as touching the adhesive with a finger) are used to determine if the materials have pressure-sensitive properties.

It is apparent, therefore, that it would be an advance in the state of the art to provide a group of selected propylene copolymers which are permanently tacky and meet the property requirements for a hot-melt, pressure-sensitive adhesive.

Accordingly, it is one of the objects of this invention to provide new olefin copolymer pressure-sensitive adhesives which can be applied to tape substrates by means of conventional hot-melt applicators.

Another object of the invention is to provide new single-component, hot-melt, pressure-sensitive adhesives which meet the critical requirements necessary for use on general purpose, pressure-sensitive tapes.

A further object of this invention is to provide new single-component hot-melt, pressure-sensitive adhesives which have good thermal stability at elevated temperatures (e.g., 350°F.).

A still further object of the invention is to provide new single-component, hot-melt, pressure-sensitive adhesive materials which have adequate pressure-sensitive adhesive properties without the addition of other chemical components (e.g., tackifiers, plasticizers, and the like).

One still further object of this invention is to provide new single-component, hot-melt, pressure-sensitive adhesives which do not bleed-through when used on paper backed tapes at use temperatures ranging from 40° to 160°F.

A still further object of the invention is to provide new, solventless, pressure-sensitive adhesives whose application and use eliminates the undesirable environmental effects of solvent-based prior art pressure-sensitive adhesives.

In accordance with this invention, it has been discovered that in order to meet the critical requirements for use as a general purpose, pressure-sensitive adhesive, a material must:

1. Provide a peel strength of at least 2.5 lb./in. — Pressure Sensitive Tape Council (PSTC) Test-1, "Peel Adhesion for Single Coated Tape, 180° Angle."
2. Provide shear adhesion or strength (holding power; static shear resistance) of >1,000 min. when tested with 1 kg. load — PSTC-7.
3. Provide a rolling ball tack value of 2 in. or less — PSTC-6, "Tack, Rolling Ball Method."
4. Have melt viscosity stability at application temperatures such that melt viscosity will change <20% in 100 hr. — J. E. Dickert, P. T. Von Bramer, W. C. Cooper and H. L. Overbay, Journal of the Technical Association of the Pulp and Paper Industry, 51, 64A (1968), and 5. Not leave a residue when coated tapes are peeled from highly polished steel at 73°F. — PSTC-1.

It has been found that only a very limited number of olefin copolymers will meet the above-cited property requirements. Suitable copolymers include propylene/higher 1-olefin copolymers containing 40–60 mole % higher 1-olefin. Operable 1-olefin monomers include 1-hexene, 1-heptene, 1-octene, 1-nonene, and 1-decene. Propylene copolymers with <40 mole % comonomer have poor tack and generally poor peel strength while those with >60 mole % comonomer have poor static shear strength and they leave a residue when tapes are peeled from polished steel plates.

In addition to the fact that suitable copolymers must contain 40–60 mole % comonomer, it is essential that the polymer molecule have a particular structure. For example, operable copolymers have no detectable crystallinity by either X-ray or DSC techniques.

It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43, 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of <0.86 and a Tg intermediate between that observed for polypropylene and that of the higher poly-1-olefin. For example, polypropylene has a Tg of about −20°C. and poly-1-hexene has a Tg of about −50°C. (J. Brandrup and E. H. Immergut editors, "Polymer Handbook", Interscience Publishers, New York City, 1966). Useful propylene/1-hexene copolymers containing 40–60 mole % 1-hexene normally show Tg values of about −30° to −45°C. If the copolymer is too "blocky" (i.e., contains relatively long segments of propylene), the copolymer will have a density of >0.86 and it will show a Tg value characteristic of propylene homopolymer (e.g., about −15° to −20°C.).

The NMR spectra can also be used to characterize the pressure-sensitive adhesives of this invention. For example, carbon-13 NMR spectra of operable propylene/1-hexene copolymers determined in a mixture of o-dichlorobenzene and deuterobenzene as solvent and hexamethyldisiloxane as an internal standard shows a single peak at 12.2 ppm. and a multiplicity of peaks centered at about 19.7, 18.9 and 18.1 ppm. The single peak at 12.2 ppm. is due to the presence of the methyl group in the butyl side groups of the 1-hexene monomer units. The three sets of multiplets are due to the methyl side groups of the propylene monomer units. There are three sets of multiplets since there are triads of propylene monomer units present in all three possible types of stereoregular configurations (e.g., lll or ddd triads, ddl or lld triads, and ldl or dld triads). These new pressure-sensitive adhesive polymers appear to be multiblock copolymers of higher 1-olefin and propylene wherein the propylene blocks are partly stereoregular and partly heterotactic segments which are predominantly <20 monomer units long and wherein the higher 1-olefin blocks are incapable of crystallization at least over the use temperature range of −20° to 180°F. We believe that while these copolymers show no detectable crystallinity by X-ray or DSC, they do contain a very low order of polypropylene-type crystallinity which accounts for their good cohesive strength in pressure-sensitive adhesive applications.

This structural interpretation of these new pressure-sensitive copolymers is supported by the measurable structure — dependent properties discussed below:

| | |
|---|---|
| Melt viscosity range, cp. at 190°C. | 10,000–75,000 |
| Composition range (higher 1-olefin concentration in mole %) | 40–60 |
| Density range, g./cc. | 0.85–0.86 |
| Tg range, °C. (glass transition temperature) | −30 to −45 |
| Tm (crystalline melting point) | no measurable Tm by DSC |

In addition to these structure-dependent properties, these pressure-sensitive adhesives can also be characterized by functional properties which are determined on 1-mil poly(ethylene terephthalate) films coated with 0.75–1.0-mil adhesive:

| | |
|---|---|
| Rolling ball tack, in. | <2.0 |
| Static shear strength range, minutes | 1,000–4,000 |
| Peel strength range, lb./in. | 2.5–5.0 |

In preparing these coated tapes, it is critical that the adhesive be applied to the poly(ethylene terephthalate) film at a melt temperature of at least 350°F. The backing material may be preheated if it is polyester, cotton or paper. Heat sensitive backing materials such as cellulose acetate or cellophane are generally not preheated in order to prevent distortion of the backing. The adhesive coating thickness is also critical since commercial coating thickness is generally 1-mil or less. Coating thicknesses of 2–3 mil give erroneous data concerning the utility of the polymer as a pressure-sensitive adhesive.

The type of catalyst and the polymerization conditions required to provide copolymers having the desired structure are quite limited. In general, the best results have been achieved by using catalyst systems which provide poor stereoregulation in the polymerization of propylene. Combinations of Et$_3$Al with AATiCl$_3$ with Al/Ti molar ratios ranging from about 1:1 to 5:1 have been found to be useful. It is also necessary to conduct the polymerization at high temperatures with the preferred temperature range being 150°–160°C. The operable temperature range is 140°–170°C. Temperatures below 140°C provide too much blocking even when using Et$_3$Al/AATiCl$_3$ catalysts. The molecular weight (melt viscosity) of copolymers made at temperatures in excess of 170°C is too low to provide adequate pressure-sensitive adhesive properties.

If catalysts which provide highly stereoregular propylene homopolymer are used to copolymerize propylene and hexene, multiblock copolymers are formed which contain crystallizable propylene segments. Thus, they have inadequate pressure-sensitive adhesive properties. Examples of highly stereospecific catalysts (for the polymerization of propylene) which provide this result include EtAlCl$_2$/Bu$_3$N/TiCl$_3$, Et$_3$Al/HPT/TiCl$_3$, and Et$_2$AlCl/HPT/TiCl$_3$ catalysts.

The preferred melt viscosity range for copolymers of this invention include about 13,000 to about 50,000 cp. at 190°C. The operable melt viscosity range is 10,000 to 75,000 cp.

The olefin copolymer pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 {pentaerythritol tetrakis[3-(3,5-di-tert-butyl-4-hydroxyphenyl)propionate]}, Eastman Inhibitor DOPC (dioctadecyl p-cresol), Plastonox 2246 [2,2'-methylene bis(4-methyl-6-tert-butylphenol)], and Ethyl 702 [4,4'-methylene bis-(2,6-di-tert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastonox 1212 provides good melt viscosity and color stability when the adhesive is maintained in molten form at 350°F. for 8 hours or longer.

The olefin copolymer adhesives of the invention may be used alone or in mixture with other materials such as polyethylene waxes, polypropylene waxes, amorphous polypropylene, amorphous block ethylene/propylene copolymer, paraffin, polyterpenes such as those commercially available and sold as "Nirez 1100", "Nirez 1135", "Piccolyte S10", "Piccolyte 40", "Piccolyte 100", or "Piccolyte 135", hydrocarbon resins such as "Piccopale 85", "Piccopale 100", "Staybelite" or DAC-B hydrocarbon resin and the like.

This invention will be further illustrated by the following examples, although it will be understood that these examples are included merely for purposes of illustration and are not intended to limit the scope of the invention.

EXAMPLE 1

In a nitrogen filled dry box, 200 ml. of dry mineral spirits, 268 ml. of 1-hexene (distilled and dried over sodium ribbon), and 0.37 g. AATiCl$_3$ are placed into a clean, dry, 1-1. Parr autoclave, equipped with a stirrer. The autoclave is sealed in the dry box. A clean, dry catalyst injector is loaded with 0.5 g. of Et$_3$Al and 35 ml. of dry mineral spirits in the dry box and then it is connected to the autoclave. The molar ratio of Al to Ti in the catalyst is 2.4 to 1.

After removing the autoclave from the dry box, 120 ml. of liquid propylene is pressured into the autoclave. This provides a monomer mixture containing 75 weight % 1-hexene. The autoclave is heated to 140°C. with stirring. Then the Et$_3$Al solution is injected into the monomer solution to initiate the copolymerization. The copolymerization is exothermic and the temperature of the reaction mixture increases to 150°C. This temperature is maintained for 3 hours and then 200 ml. of isobutyl alcohol is pumped into the autoclave to deactivate the catalyst. The temperature is maintained at 150°C. for an additional 15 minutes. Then the autoclave is cooled to 23°C., vented, and the copolymer is placed in an excess of isobutyl alcohol. The mixture is heated to 105°C., cooled, filtered and the soft, sticky, colorless copolymer is washed with additional isobutyl alcohol to remove catalyst residues. The copolymer is stabilized with 0.25% Irganox 1010 and dried in a vacuum oven at 70°–80°C. The yield of copolymer is 186 g. (77% conversion). It contains 43 mole % 1-hexene (60 wt. % 1-hexene) as determined by an NMR analysis. This tacky copolymer has a melt viscosity of 21,300 cp. at 190°C., an I.V. of 0.54, a Tg of −33°C. and a density of 0.855. There is no detectable crystallinity in the sample by either X-ray or DSC analysis.

The copolymer is heated to 177°C. (350°F.) and coated onto polyethylene terephthalate film by means of a hot Doctor blade to give a uniform 1-mil coating. This coated tape performs well as pressure-sensitive tape material. For example, the polymer coating remains permanently tacky and it has good adhesion to paper, steel, polyethylene, poly(ethylene terephthalate) and the like. When the tape is peeled away from a clean stainless steel surface, no polymer residue is left on the steel demonstrating that the copolymer has good cohesive strength. The tape has a rolling ball tack value of 3.8 cm. (1.5 in.), peel strength (on steel) of 3.1 lb./in. and static shear strength (measured on steel using 1,000 g. weight) of 3,596 min. When a torn page is mended with this tape, the printed matter under the tape is quite legible.

Similarly good results were obtained when the hot-melt, pressure-sensitive copolymer is coated on black paper, crepe paper, 60 lb. Krome-Kote paper, cloth, cellophane, and cellulose acetate film backing materials.

EXAMPLE 2

The procedure of Example 1 is repeated except that a different monomer ratio is used (300 ml. 1-hexene and 87 ml. propylene). The tacky, amorphous copolymer was obtained in 40% conversion and it has a melt viscosity of 23,500 cp. at 190°C., an I.V. of 0.55 and a Tg of −40°C. It contains 48 mole % 1-hexene. Coated poly(ethylene terephthalate) tape has a peel strength of 2.9 lb./in. width, rolling ball tack of 3.7 cm. and static shear strength of 1,658 minutes. This copolymer also has pressure-sensitive adhesive properties.

EXAMPLE 3

Example 1 is followed, except that AATiCl$_3$/Et$_2$AlCl/Bu$_3$N (1/0.75/0.75) catalyst is used at a polymerization temperature of 140°C. The conversion of monomer to copolymer is 88%. The product contains 46 mole % 1-hexene, has a melt viscosity of 25,500 cp. at 190°C., a density of 0.856, and a Tg of −16°C. This Tg value indicates the presence of substantial blocks of propylene monomer units. This "blockiness" probably accounts for the fact that coated poly(ethylene terephthalate) tape (with an adhesive thickness of 1 mil) has a rolling ball tack value of 6.2 cm. and a peel strength of only 2.0 lb./in. Thus, the copolymer of this example is unsuitable as a pressure-sensitive adhesive for general purpose tape even though it contains a 1-hexene concentration similar to that of the copolymer of Example 2.

EXAMPLE 4

The procedure of Example 1 is followed except that the molar ratio of Al/Ti in the catalyst is 0.67 to 1 instead of 2.4 to 1. The conversion of monomer to copolymer is 80%. The copolymer has a melt viscosity of 23,500 cp. at 190°C., a density of 0.846, a Tg of −40°C., and it contains 44 mole % 1-hexene. Coated poly(ethylene terephthalate) tape has strength of peel strength of 3.4 lb./in., a rolling ball tack of 4.7 cm. and a static shear strength of 497 min. Thus, this copolymer has some desirable pressure-sensitive adhesive properties, but it is deficient in static shear strength. This example illustrates the critical nature of molar ratio of Et$_3$Al to AATiCl$_3$ in providing copolymers which will meet all critical pressure-sensitive adhesive properties.

EXAMPLE 5

1-Hexene (in the absence of propylene) is polymerized according to the procedure of Example 1. The conversion of monomer to polymer is 29%. The tacky, colorless poly-1-hexene has a melt viscosity of 21,200 cp. at 190°C., a density of 0.854, and Tg of −48°C. Coated poly(ethylene terephthalate) tape has a rolling ball tack value of 1.3 cm. and a peel strength of about 3.2 lb./in. However, in the peel strength test, the adhesive fails by a cohesive mechanism and a polymer residue is left on the steel plate as the coated tape is peeled away. Also, the static shear strength of the tape is only about 100 min. Thus, this polymer is not a suitable pressure-sensitive adhesive for general purpose tape applications.

EXAMPLE 6

The procedure of Example 1 is followed, except that a 90/10 weight % 1-hexene/propylene monomer mixture is used. The conversion of monomer to copolymer is 71%. The copolymer has a melt viscosity of 21,300 cp. at 190°C., and it contains 65 mole % 1-hexene. Coated poly-(ethylene terephthalate) tape has a peel strength of 3.1 lb./in. width, rolling ball tack of 4.0 cm. and static shear strength of 124 min. Thus, this copolymer has inadequate static shear strength for general purpose pressure sensitive tape.

EXAMPLE 7

The procedure of Example 1 is followed, except that 80/20 weight % 1-hexene/propylene monomer mixture is used. The conversion of monomer to copolymer is 75%. The copolymer has a melt viscosity of 28,000 cp. at 190°C., and it contains 58 mole percent 1-hexene. Coated poly(ethylene terephthalate) tape has a peel strength of 3.2 lb./in. width, rolling ball tack of 3.7 cm. and static shear strength of 1425 minutes. This copolymer has pressure-sensitive adhesive properties.

EXAMPLE 8

The procedure of Example 1 is followed except that a monomer mixture containing 70 wt. % 1-hexene is used. The conversion of monomer to copolymer is 62%. The copolymer has a melt viscosity of 15,000 cp. at 190°C., and it contains 37 mole % 1-hexene. Coated poly(ethylene terephthalate) tape has a peel strength of 3.6 lb./in. width, rolling ball tack of 4.0 cm. and static shear strength of about 843 min. Thus, this copolymer is borderline in static shear strength.

EXAMPLE 9

The procedure of Example 1 is followed, except that HATiCl$_3$/Et$_3$Al/HPT (1/0.75/0.75) catalyst and a 60/40 wt. % 1-hexene/propylene monomer mixture are used. The conversion of monomer to copolymer is 35%. The copolymer obtained has a melt viscosity of 495,000 cp. at 190°C., and it contains 18 mole % 1-hexene. This copolymer contains crystallinity which is characteristic of polypropylene (detected by X-ray analysis) and it shows a Tm of 145°C., and Tc of 102°C. by DSC analysis. It is nontacky and does not possess contact adhesion when coated poly(ethylene terephthalate) tape is touched to a steel plate.

Thus, copolymers containing relatively low concentrations of 1-hexene and which contain substantial amounts of crystallinity do not possess pressure-sensitive adhesive properties.

EXAMPLE 10

The procedure of Example 1 is repeated except that the mole ratio of Al to Ti is 1 to 1. The copolymer (25,000 cp. at 190°C.) is obtained in 71% conversion, and it contains 43 mole % 1-hexene. It has a density of 0.856 and a Tg of −37. Its pressure-sensitive adhesive properties are similar to those of the copolymer described in Example 1.

EXAMPLE 11

The procedure of Example 1 is repeated except that the mole ratio of Al to Ti is 5 to 1. The copolymer is obtained in 62% conversion. Its physical properties and pressure-sensitive adhesive properties are similar to those of the copolymer described in Example 1.

EXAMPLE 12

The procedure of Example 1 is followed except that the monomer mixture contains 80 wt. % 1-octene instead of 75 wt. % 1-hexene. The propylene/1-octene copolymer is obtained in a conversion of 69%. It contains 44 mole % 1-octene and it has a density of 0.854. Its pressure-sensitive adhesive properties are similar to those of the propylene/1-hexene copolymer described in Example 1.

Similar results are achieved when 80 wt. % 1-decene is used instead of the 1-octene.

EXAMPLE 13

The procedure of Example 1 is followed except that the monomer mixture contains 20 wt. % propylene, 40 wt. % 1-hexene and 40 weight % 1-octene. The propylene/1-hexene/1-octene terpolymer is obtained in 63% conversion. This tacky copolymer has no detectable crystallinity by either DSC or X-ray analysis, has a density of 0.854 and a Tg of −38. Its pressure-sensitive adhesive properties are similar to those of the propylene/1-hexene copolymer described in Example 1.

The olefin copolymer adhesives of this invention are useful as pressure sensitive adhesives. As pressure sensitive adhesives they find utility in preparing tapes by applying the adhesive by conventional means to a substrate such as a film which can be prepared from conventional film materials such as a polyester, for example. The pressure sensitive adhesive can also be applied onto labels, decals, floor tile as well as wall coverings, such as wall paper, and shelf coverings, such as shelf paper.

The invention has been described in considerable detail with particular reference to certain preferred embodiments thereof, but it will be understood that variations and modifications can be effected within the spirit and scope of the invention.

We claim:

1. A hot melt, pressure sensitive adhesive comprising an amorphous propylene/higher 1-olefin copolymer containing 40 to 60 mole percent higher 1-olefin having a melt viscosity range at 190°C. of 10,000 cp. to 75,000 cp., a density of 0.85 to 0.86, a glass transition temperature of −30° to −45°C., and having no melting point measurable by Differential Scanning Calorimetry, wherein said higher 1-olefin is a member of the group consisting of 1-hexene, 1-heptene, 1-octene, 1-nonene and 1-decene.

2. A hot melt, pressure sensitive adhesive according to claim 1 wherein said amorphous propylene/higher 1-olefin copolymer is a propylene/1-hexene copolymer.

3. A hot melt, pressure sensitive adhesive according to claim 1 wherein said amorphous propylene/higher 1-olefin copolymer is a propylene/1-heptene copolymer.

4. A hot melt, pressure sensitive adhesive according to claim 1 wherein said amorphous propylene/higher 1-olefin copolymer is a propylene/1-octene copolymer.

5. A hot melt, pressure sensitive adhesive according to claim 1 wherein said amorphous propylene/higher 1-olefin copolymer is a propylene/1-nonene copolymer.

6. A hot melt, pressure sensitive adhesive according to claim 1 wherein said amorphous propylene/higher 1-olefin copolymer is a propylene/1-decene copolymer.

7. A hot melt, pressure sensitive adhesive comprising an amorphous propylene/higher 1-olefin copolymer containing 40 to 60 mole percent higher 1-olefin having a melt viscosity range at 190°C. of 13,000 cp. to 50,000 cp., a density of 0.85 to 0.86, a glass transition temperature of −30° to −45°C., and having no melting point measurable by Differential Scanning Calorimetry, wherein said higher 1-olefin is a member of the group consisting of 1-hexene, 1-heptene, 1-octene, 1-nonene and 1-decene.

8. A hot melt, pressure sensitive adhesive according to claim 7 wherein said amorphous propylene/higher 1-olefin copolymer is a propylene/1-hexene copolymer.

9. A hot melt, pressure sensitive adhesive according to claim 7 wherein said amorphous propylene/higher 1-olefin copolymer is a propylene/1-heptene copolymer.

10. A hot melt, pressure sensitive adhesive according to claim 7 wherein said amorphous propylene/higher 1-olefin copolymer is a propylene/1-octene copolymer.

11. A hot melt, pressure sensitive adhesive according to claim 7 wherein said amorphous propylene/higher 1-olefin copolymer is a propylene/1-nonene copolymer.

12. A hot melt, pressure sensitive adhesive according to claim 7 wherein said amorphous propylene/higher 1-olefin copolymer is a propylene/1-decene copolymer.

* * * * *